United States Patent
Rebele et al.

(10) Patent No.: US 10,464,651 B2
(45) Date of Patent: Nov. 5, 2019

(54) STERNBOARD DRIVE FOR MARINE ELECTRIC PROPULSION

(71) Applicant: Pure Watercraft, Inc., Seattle, WA (US)

(72) Inventors: Andrew H. Rebele, Seattle, WA (US); Christopher M. Gil, Kent, WA (US); Kerwin Loukusa, Seattle, WA (US); Matthew M. O'Brien, Hermosa Beach, CA (US); Zachary Meyer Omohundro, Hermosa Beach, CA (US); Nathan Schroeder, Hermosa Beach, CA (US)

(73) Assignee: Pure Watercraft, Inc., Seattle, WA (US)

( * ) Notice: Subject to any disclaimer, the term of this patent is extended or adjusted under 35 U.S.C. 154(b) by 11 days.

(21) Appl. No.: 14/936,781

(22) Filed: Nov. 10, 2015

(65) Prior Publication Data

US 2016/0059949 A1 Mar. 3, 2016

Related U.S. Application Data

(63) Continuation-in-part of application No. 14/271,404, filed on May 6, 2014, now abandoned.

(51) Int. Cl.
*B63H 21/17* (2006.01)
*B63H 20/02* (2006.01)
(Continued)

(52) U.S. Cl.
CPC .............. *B63H 21/17* (2013.01); *B60L 50/90* (2019.02); *B63H 20/02* (2013.01); *B63H 20/14* (2013.01);
(Continued)

(58) Field of Classification Search
CPC .......... B63H 21/17; B63H 5/07; B63H 21/21; B63H 2021/202; B63H 21/00;
(Continued)

(56) References Cited

U.S. PATENT DOCUMENTS 3,841,396 A * 10/1974 Knaebel ................. B63H 21/10
165/168
4,009,677 A 3/1977 Croisant et al.
(Continued)

FOREIGN PATENT DOCUMENTS

DE 102013218674 3/2015
EP 2372828 10/2011
(Continued)

OTHER PUBLICATIONS

Shimizu Takashi, Electric Outboard Motor, Jun. 23, 2005, Suzuiki Motor Corp, JPO, JP 20051620545.*
(Continued)

*Primary Examiner* — Julio C. Gonzalez
*Assistant Examiner* — Alexander A Singh
(74) *Attorney, Agent, or Firm* — Perkins Coie LLP

(57) ABSTRACT

A watertight, transom mounted, electric marine sterndrive propulsion drive unit mounted to an external surface of the transom of a marine vessel comprising an integrated electric motor with an output shaft, an intermediate drive shaft mechanically coupled to the electric motor output shaft, one or more propeller shafts mechanically coupled to the drive shaft, and one or more propellers mechanically coupled to the one or more propeller shafts.

20 Claims, 7 Drawing Sheets

(51) Int. Cl.
*H02K 7/14* (2006.01)
*B60L 50/90* (2019.01)
*B63H 20/14* (2006.01)
*H02K 7/116* (2006.01)
*B63H 20/00* (2006.01)
*B63H 25/02* (2006.01)

(52) U.S. Cl.
CPC ............... *H02K 7/116* (2013.01); *H02K 7/14* (2013.01); *B60L 2200/32* (2013.01); *B60L 2240/421* (2013.01); *B63H 2020/003* (2013.01); *B63H 2020/006* (2013.01); *B63H 2025/028* (2013.01); *Y02T 10/641* (2013.01); *Y02T 10/642* (2013.01)

(58) Field of Classification Search
CPC ........ B63H 20/00; B63H 20/02; B63H 20/14; B63H 2020/006; B63H 2020/003; B63H 2025/028; B60L 2200/32; B60L 8/00; B60L 9/00; B60L 2200/00; B60L 50/90; B60L 2240/421; H02K 9/00; H02K 9/16; H02K 9/18; H02K 9/19; H02K 9/193; H02K 9/197; H02K 7/14; H02K 7/116; Y02T 10/641; Y02T 10/642
USPC .......................................................... 310/54
See application file for complete search history.

(56) References Cited

U.S. PATENT DOCUMENTS

| | | | |
|---|---|---|---|
| 4,092,946 A | 6/1978 | Kappas | |
| 4,099,478 A | 7/1978 | Alexander, Jr. | |
| 4,305,012 A | 12/1981 | Friedel | |
| 4,568,289 A * | 2/1986 | Heidrich | B63H 23/12 440/3 |
| 5,296,797 A | 3/1994 | Bartlett | |
| 5,445,545 A | 8/1995 | Draper | |
| 5,967,863 A * | 10/1999 | Marchant | B63G 13/02 181/206 |
| 6,231,407 B1 | 5/2001 | Hein et al. | |
| 7,270,074 B2 | 9/2007 | Pradetto et al. | |
| 8,658,299 B2 | 2/2014 | Yang et al. | |
| 2005/0275372 A1 | 12/2005 | Crowell | |
| 2008/0268333 A1 | 10/2008 | Barrella et al. | |
| 2010/0248562 A1* | 9/2010 | Daikoku | B63H 20/30 440/3 |
| 2011/0263165 A1* | 10/2011 | Rolla | B63H 5/1252 440/6 |
| 2012/0149516 A1* | 6/2012 | Larrabee | F16H 3/72 475/5 |
| 2012/0282497 A1 | 11/2012 | Yang et al. | |
| 2012/0282825 A1* | 11/2012 | Lin | B63H 20/14 440/6 |
| 2013/0229072 A1* | 9/2013 | Matsuda | B62K 11/04 310/53 |
| 2014/0187107 A1* | 7/2014 | Gemin | B63H 21/22 440/3 |
| 2015/0130421 A1 | 5/2015 | Bevilacqua, III | |
| 2015/0357692 A1 | 12/2015 | Piggott et al. | |
| 2016/0114692 A1 | 4/2016 | Tripathi et al. | |

FOREIGN PATENT DOCUMENTS

| | | | | |
|---|---|---|---|---|
| JP | 2005162055 A | * | 6/2005 | ........... B63H 20/007 |
| WO | WO-2014021841 | | 2/2014 | |

OTHER PUBLICATIONS

"Compound Planetary Gear," Planetary Gear Train with Stepped Planet Gear Set—MATLAB, http://www.mathworks.com, accessed Aug. 25, 2017, 3 pages.

Nitrofreeze "Shrink Fitting," https://web.archive.org/web/20160724183319/http://nitrofreeze.com/services/custom-cryogenic-processing/shrink-fitting/, Jul. 24, 2016, 3 pages.

* cited by examiner

STERNBOARD DRIVE FOR MARINE ELECTRIC PROPULSION

PRIORITY

The present invention claims the benefit of U.S. Provisional application 61/820,163 filed May 6, 2013 and is a Continuation-In-Part of U.S. Conventional application Ser. No. 14/271,404 filed 6 May 2014.

FIELD OF THE INVENTION

The present invention relates to electric sternboard drives for marine electric propulsion.

BACKGROUND OF THE INVENTION

Conventional propulsion units for marine vessels include, inboard drives, outboard drives, and sternboard drives. Sternboard drives (often referred to as a "sterndrive") are popular in recreational marine vessels. With a sterndrive vessel, an internal combustion or diesel engine resides inside the hull of the vessel and the drive is mounted to the transom of the vessel. However, conventional existing drives have many disadvantages. For example, a drive shaft must connect the internal combustion engine with the drive and penetrate the transom to transmit power to the sternboard drive. This requires a sizable hole through the transom or hull that weakens the transom and provides a potential leak path. Furthermore, the engine, which must be mounted adjacent to the transom, takes up a large amount of space in the hull that could be used for other purposes such as for passengers or storage. The engine also adds a significant amount of weight in the rear of the vessel that requires ballast elsewhere in the vessel for balancing, handling and operational stability of the vessel. Combustion engines also require frequent maintenance to keep them operating properly, and they produce harmful emissions, excessive noise, and undesirable fumes and odors.

The present invention pertains to a propulsion drive mounted to the transom of a marine vessel whereby the means of propulsion is an electric motor that forms a part of the drive. This invention is an improvement to an existing sternboard drive, which is typically driven by a shaft that penetrates the transom and is powered by an internal combustion or diesel engine located inside the vessel.

Electric outboard motors have been available for many years. An electric outboard motor is a one-piece unit that is removable and can be attached to a transom usually by a clamping system. An electric outboard can be steered by hand or through a steering mechanism. One example is an electric outboard drive discussed in U.S. Pat. No. 8,529,305 to Lin. This invention describes an electric outboard drive adapted to be mounted on a transom of a boat through a mounting bracket and includes a driving device and a propelling device. In contrast, the present invention teaches a watertight, transom mounted, permanent electric marine sterndrive propulsion drive unit mounted to an external surface of the transom of a marine vessel comprising an integrated electric motor.

In a more recent attempt at incorporating an electric motor, U.S. Pat. No. 8,333,626 to Daikoku teaches the use of a hybrid outboard motor that includes an internal combustion engine and an electric motor wherein the power plant is encased in a watertight box or casing that is attached to the external surface of the transom. While Daikoku incorporates an electric motor, he incorporates the electric motor with a conventional internal combustion engine that resides within the hull of the vessel.

While others have developed electric recreational boats with sterndrive units, they place the electric motor inside the hull of the vessel much like the placement of an internal combustion engine.

All of the above conventional arrangements suffer from one or more of the same drawbacks. In contrast, the present invention solves the above deficiencies by integrating an electric motor on the outside of the hull as a one-piece unit. In placing the electric motor outside of the hull, the present invention does not require the placement of a driveshaft through the hull, nor does it require placement of an internal combustion engine, or electric motors, within the hull. Without an internal combustion engine adjacent to the transom, there is no need to provide offsetting ballast to compensate for the weight of an internally positioned engine. While the sterndrive of the present invention adds the weight of a sterndrive-mounted electric motor, the battery packs can be positioned within the hull to offset the weight and maximize performance and stability of the vessel.

SUMMARY OF THE INVENTION

The present invention solves the aforementioned problems with conventional internal combustion sterndrives and provides a propulsion drive mounted to a transom of a marine vessel wherein the propulsion drive is driven by an electric motor that forms part of the propulsion drive unit. With an integrated electric motor as part of the drive unit there is no need for penetrating the hull with a drive shaft and assorted components as is customary with conventional sterndrives.

Specifically, the present invention provides a watertight, transom mounted, electric marine sterndrive propulsion drive unit mounted to an external surface of the transom of a marine vessel comprising an integrated electric motor with an output shaft, an intermediate drive shaft mechanically coupled to the electric motor output shaft, one or more propeller shafts mechanically coupled to the drive shaft, and one or more propellers mechanically coupled to the one or more propeller shafts, wherein the propulsion drive unit comprises a water tight housing and the electric motor is fixedly secured and integrated to the propulsion drive unit and wherein the electric motor output shaft, the intermediate drive shaft and the one or more propeller shafts transmit power from the electric motor to the one or more propellers.

More specifically, the present invention provides a sterndrive with a vertical or horizontal orientation of the electric motor. The various conventional mechanical couplings between the motor and the propellers depend on the motor configuration and can include gears, belts and chains.

DETAILED DESCRIPTION OF THE INVENTION

The sterndrive of the present invention consists of, at a minimum, an electric motor and drive shaft, a propeller shaft, a means to transmit power from the electric motor drive shaft to the propeller shaft including required elements for the mechanical transmission, a housing within which some or all of the components are packaged, one or more propellers, a mounting interface to the transom of the vessel, and mechanisms by which the drive can be pivoted for steering, trim adjustment, and tilt adjustment.

In one embodiment the drive can also include an integrated electronic controller for control of the electric motor. In another embodiment the drive can also include one or more conventional electric or hydraulic actuators for adjustment of trim and tilt. In another embodiment the drive can also include one or more conventional electric or hydraulic actuators for adjustment of steering. In yet another embodiment the drive can also include a closed-loop liquid cooling system for the electric motor whereby coolant is pumped around or directly through the electric motor to remove excess heat and then through a heat exchanger to dissipate the excess heat. In yet another embodiment the closed-loop liquid cooling system is also used to lubricate the bearings and gears.

Figure 1:
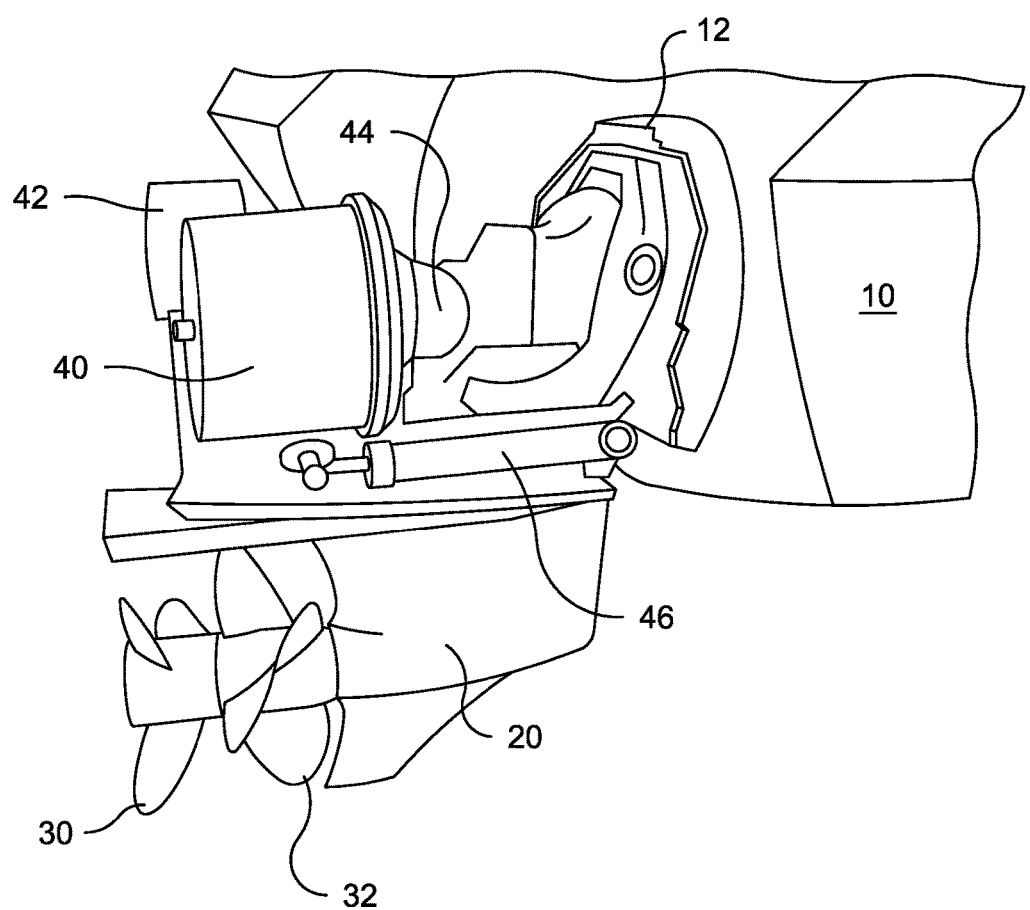
FIG. 1 illustrates the sterndrive of the present invention.

FIG. 1 illustrates one embodiment of the sterndrive of the present invention. The sterndrive is attached to the transom 10 of a marine vessel using a mounting interface 12. As shown in FIG. 1, the electric motor 40 is oriented horizontally with its drive shaft (shown in FIG. 4) pointing toward or away from the stern of the vessel. The electric motor 40 can be an AC induction, permanent magnet or any suitable conventional electric motor.

For illustration purposes only, a brushless motor with 3-phase field windings is described in the present figures and specification. Various other types of electric motors can be used that do not use 3-phase field windings and, therefore, have different cabling requirements between the motor controller and the motor. For example, a DC motor likely has a motor controller but does not need an inverter as presently depicted. Furthermore, other types of motors can be used that can require a different number of cables. While the present invention illustrates a fourth cable for motor speed feedback, any number of cables can be used depending on the individual requirements. For example, additional cables can be used with the incorporation of temperature sensors.

The upper gear set 44 mechanically couples the electric motor 40 to the one or more propellers 30 and 32 by one or more propeller shafts 20. Also shown is a motor controller 42 that is attached to the electric motor 40. A conventional arrangement of one or more electric or hydraulic actuators 46 is shown for at least one of steering, tilt and trim adjustment. In this configuration there is also a conventional means to transmit power from the electric motor shaft to the parallel-oriented propeller shaft. This means can be a belt or chain connected to each shaft, or two right angle gear sets with an intermediate shaft.

Figure 2:
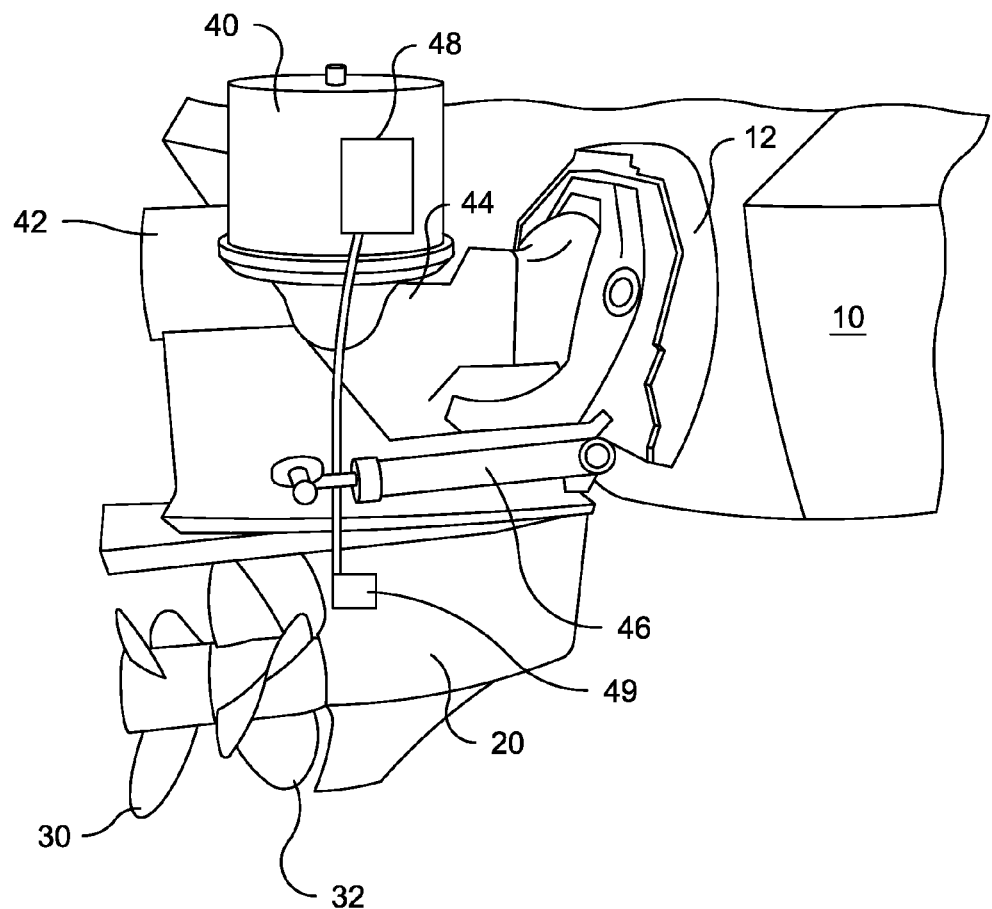
FIG. 2 is a side view of the present invention with a vertical motor orientation and the liquid cooling system.

In an alternative embodiment, the electric motor 40 can also be oriented vertically with its drive shaft pointing downward. FIG. 2 illustrates this vertical arrangement and includes the motor 40 in the vertical position. In this configuration there would be one right angle gear set to transmit power from the electric motor shaft to the propeller shaft. There can also be a separate conventional means to reduce or increase rotational speed relative to the electric motor shaft. This means can be an inline planetary gear set or a parallel shaft driven by gears, chain, or belt.

Regardless of the electric motor 40 orientation, the entire sterndrive unit including the electric motor 40 and inverter/controller 42, the cabling 43a, 43b, 43c and 45, can be watertight. In one embodiment, the electric motor 40 has its own separate housing and is watertight. And while one or more components can be housed together in a watertight casing, this is not essential as each component can be made watertight individually. Regardless of the configuration, all of the components are watertight, or in a watertight casing, so that the electric motor 40 and motor controller 42 on the sterndrive can be positioned outside of the hull and in the water at all times.

Also shown in FIG. 2 is a closed loop liquid cooling system 48 that uses a heat exchanger 49 for dissipating excess heat through the surrounding water. With a closed loop cooling system, the cooling fluid is continually circulated through the system as needed to cool the motor. The cooling system does not draw in water from the surrounding body of water as in conventional outboard motors. This eliminates internal contamination and corrosion associated with conventional open cooling systems. In the present closed loop cooling system, the heat exchanger 49 remains beneath the water surface at low speed operation or at higher speed when the marine vessel is planing.

Figure 3:
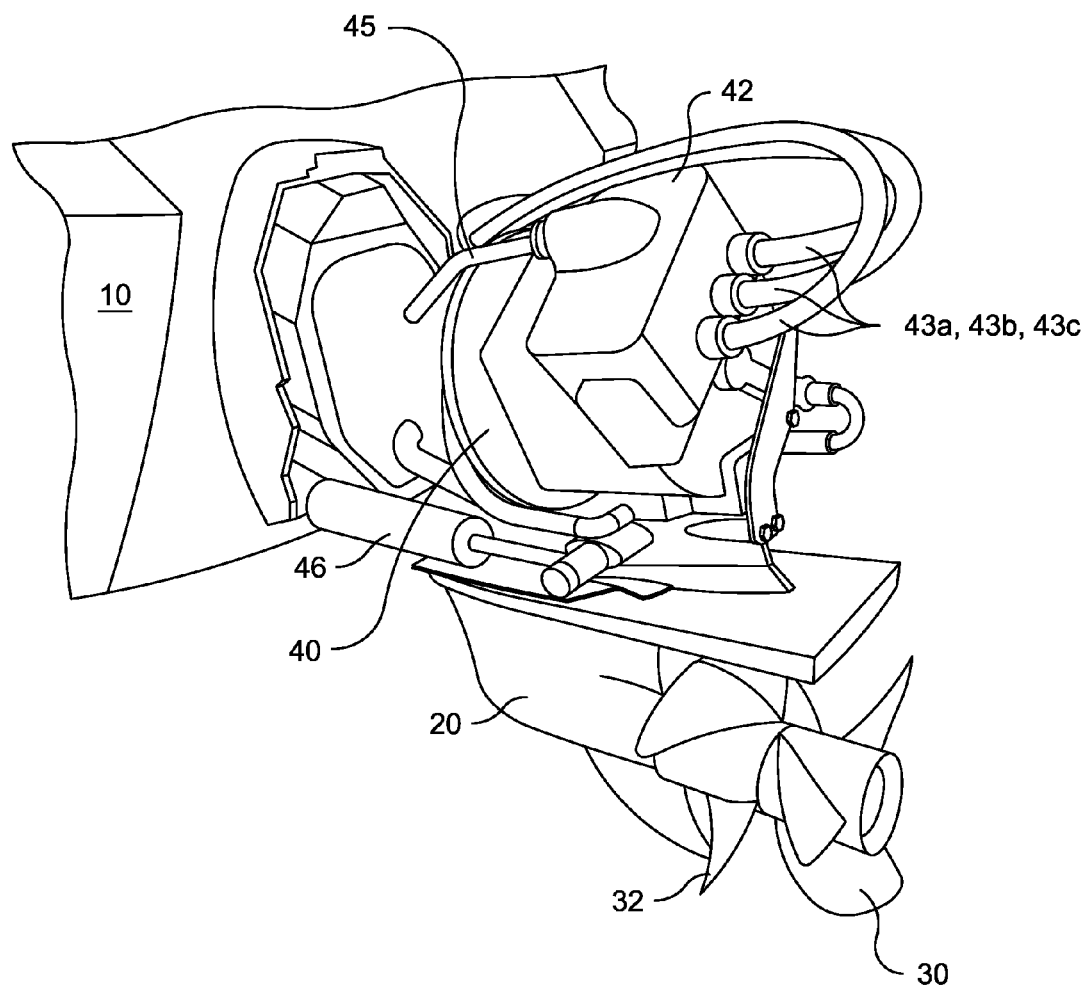
FIG. 3 is a side view of the present invention with the inverter and electronic controller connected to the electric motor.

FIG. 3 is a side view of the sterndrive of the present invention. Again, the sterndrive is attached to the transom 10 of the marine vessel. Connected to the electric motor 40 is the inverter/motor controller 42. The inverter takes a DC power source and "inverts" it to a 3-phase AC power source to drive the electric motor 40. The inverter/controller 42 can be mounted to the electric motor 40 or located within the hull. The motor controller 42 is connected to the electric motor 40 through three cables 43a, 43b and 43c. While not shown, an alternative embodiment can include the motor controller mounted within the hull of the vessel.

Figure 4:
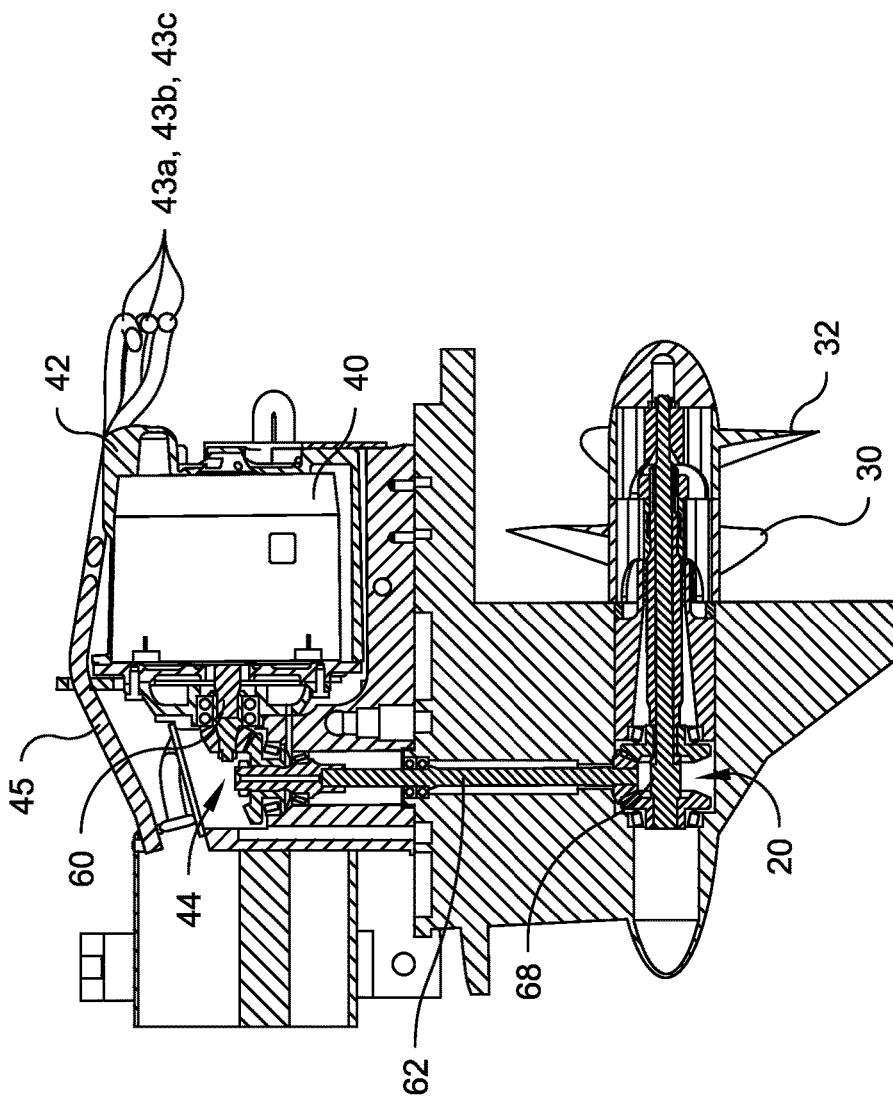
FIG. 4 is a side cutaway view of the sterndrive illustrating the mechanical coupling between the motor and propeller.

A cutaway side view of the sterndrive is shown in FIG. 4. In this illustration, the electric motor 40 is shown in a horizontal orientation. The output shaft 60 of the electric motor 40 extends from the motor 40 toward the transom of the marine vessel. The output shaft 60 is mechanically coupled to the upper gear set 44. The upper gear set 44 is coupled with the intermediate drive shaft 62. And the intermediate drive shaft 62 is coupled to the one or more propeller shafts 20 (one propeller shaft per propeller) through the lower gear set 68. The one or more propeller shafts 20 drive the one or more propellers 30 and 32.

Also shown in FIG. 4 is the motor controller 42 that is connected to the electric motor 40 by three cables 43a, 43b and 43c. The motor controller 42 is connected to an onboard computer (not shown) through cable 45 (also shown in FIGS. 3 and 5).

Figure 5:
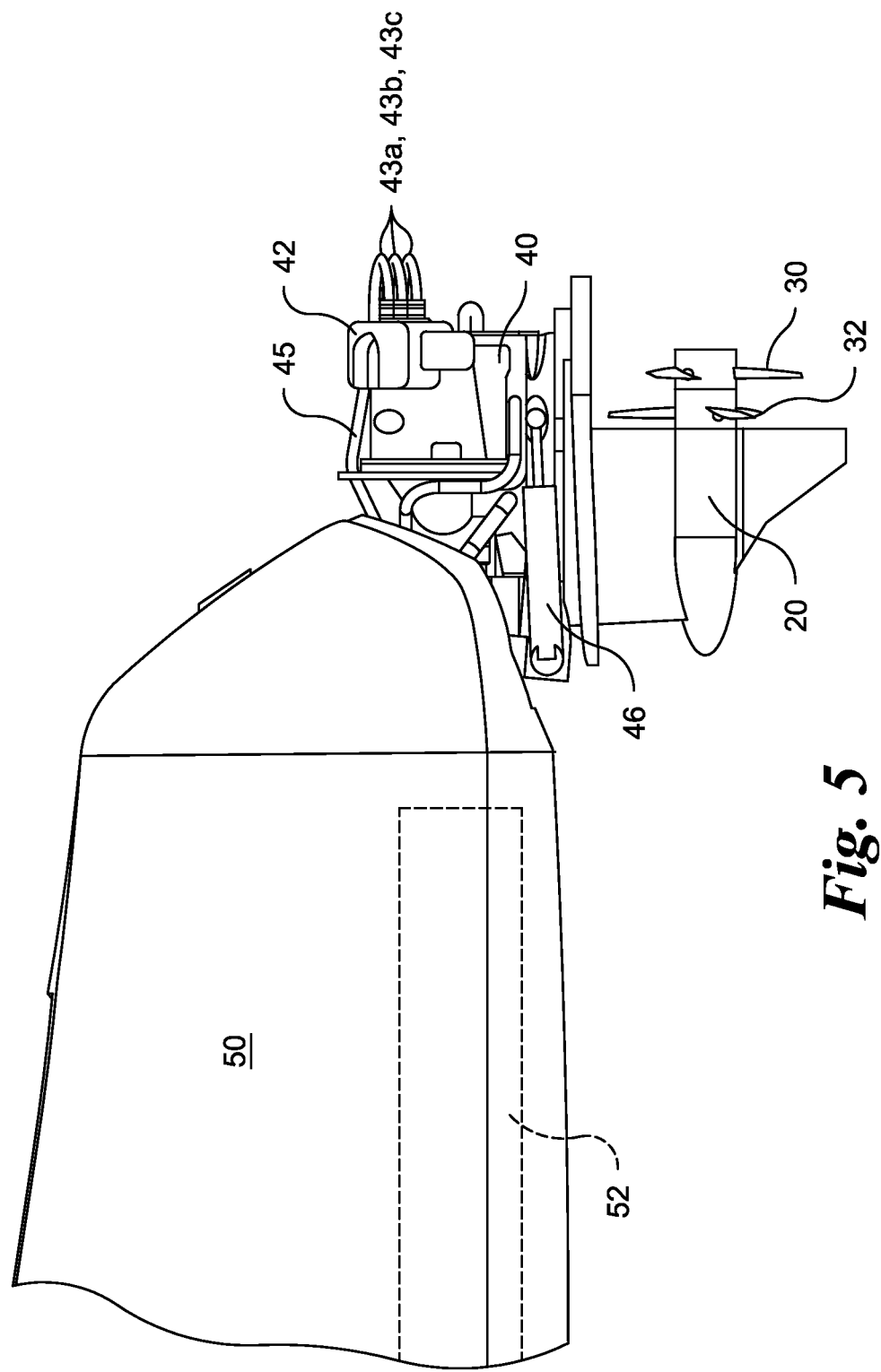
FIG. 5 is a side view of the sterndrive of the present invention connected to the stern of a marine vessel.

FIG. 5 illustrates the sterndrive attached to the stern of a marine vessel 50. Although not shown in this depiction, the sterndrive is connected directly to the transom of the vessel using an appropriate mounting interface (as shown in FIG. 1). FIG. 5 also shows the placement of a battery pack 52 within the hull of the vessel 50. The arrangement of battery packs 52 can be changed based upon the weight and balance of the vessel and the desired number of batteries to be incorporated into the vessel.

Figure 6:
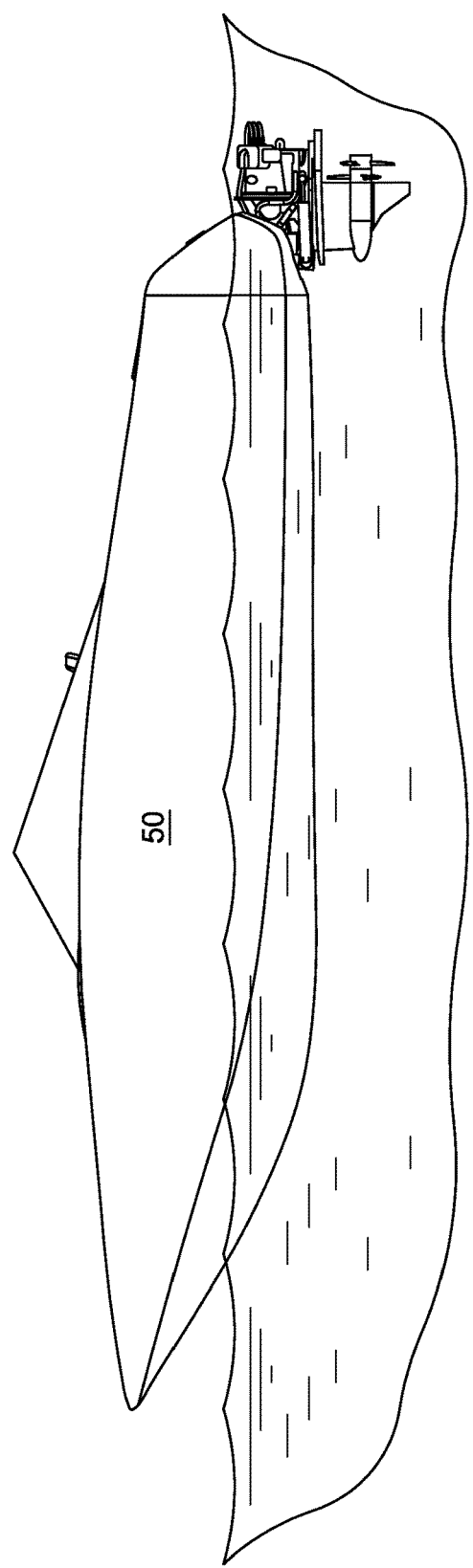
FIG. 6 illustrates the sterndrive completely submerged beneath the waterline while in low speed operation.
Figure 7:
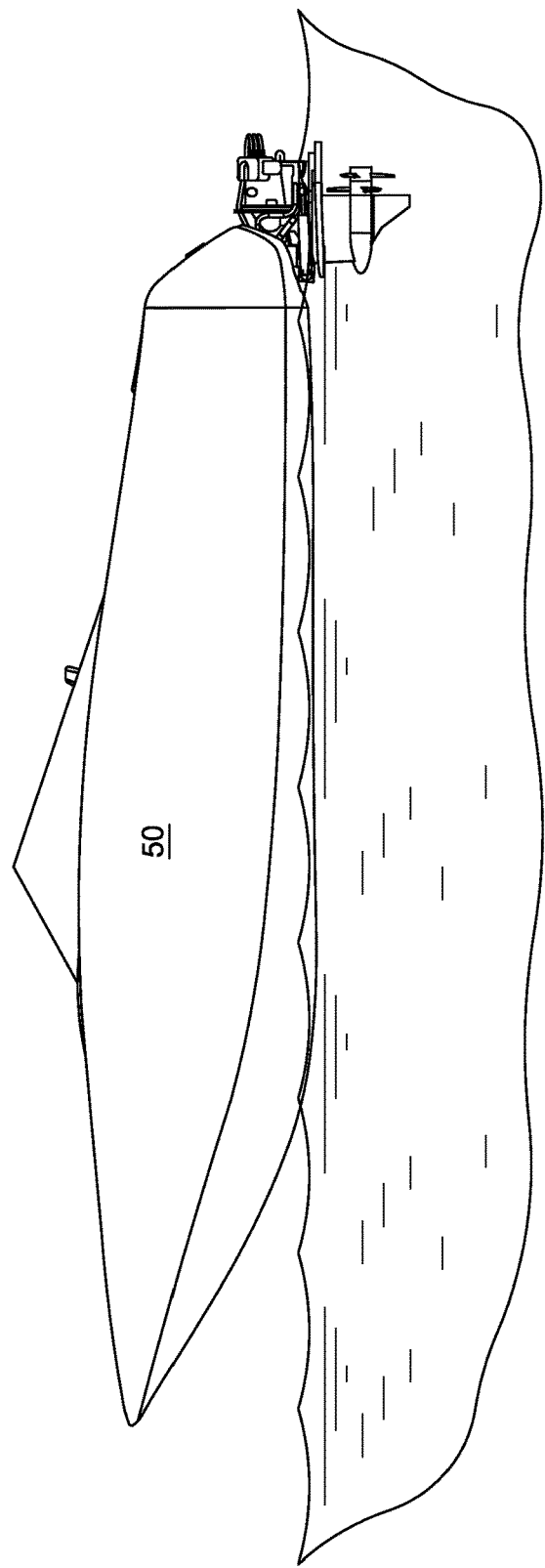
FIG. 7 illustrates the sterndrive on a marine vessel while planing.

During lower speed operation, the vessel may not reach sufficient speed to plane. FIG. 6 illustrates a marine vessel operating with the sterndrive of the present invention at slower speed. When operated at slower speed, the complete sterndrive with integrated electric motor can remain completely submerged beneath the waterline. In contrast, FIG. 7 shows the marine vessel under higher speed operation once the vessel has reached a sufficient planing speed using an appropriate trim setting. While planing, the marine vessel rides higher in the water thereby exposing the upper portion of the sterndrive including the electric motor 40 to the air. Even though the electric motor may not be submerged during planing, the liquid cooling system would provide heat dissipation as a portion of the system will remain submerged under water.

The invention described herein holds many advantages over present technology. For example, since all of the mechanical power elements are located outside the hull there is no need for a large penetration through the transom. Aside from the structural attachment between the drive and transom, the only elements required to cross the transom plane are electrical harnesses, which could be passed through a much smaller penetration or routed over the top edge of the transom. This significantly increases the structural capability and rigidity of the transom, and minimizes the potential for leakage into the hull.

Another advantage of the invention is that the electric motor, which replaces the internal combustion engine, saves a significant amount of weight and is located outside the hull. This adds additional passenger or equipment volume inside the hull and eliminates the need for offsetting ballast. Some or all of the weight savings are offset by the weight of batteries, however the battery weight can be distributed throughout the hull as needed to optimize handling and stability.

Furthermore, electric motors are inherently low maintenance, which is another advantage over existing internal combustion marine engines. Additionally, electric propulsion generates zero emissions or odors and minimal acoustic noise compared with internal combustion or diesel engines.

The invention is further exemplified by the following claims.

We claim:

1. An electric sterndrive propulsion unit mountable to an external surface of a water vessel transom having an upper extremity, the propulsion unit comprising:
   a sterndrive housing containing no internal combustion engine and configured to fit below the upper extremity of the transom;
   an electric motor positioned within the housing and having an output shaft;
   an electrical cable couple to the electric motor and positioned to extend through the transom to an electrical power source;
   an intermediate drive shaft positioned within the housing and mechanically coupled to the output shaft;
   one or more propeller shafts mechanically coupled to the intermediate drive shaft and extending outwardly from the housing; and
   one or more propellers mechanically coupled to the one or more propeller shafts external to the housing and positioned to be fully submerged.

2. The electric sterndrive propulsion unit of claim 1, further comprising a mechanical transmission connected between the output shaft and the one or more propeller shafts.

3. The electric sterndrive propulsion unit of claim 1 wherein the electric motor is oriented horizontally, with the output shaft pointed toward or away from the transom and parallel to the one or more propeller shafts, and wherein the drive shaft is oriented perpendicular to both the electric motor output shaft and the one or more propeller shafts.

4. The electric sterndrive propulsion unit of claim 3, further comprising at least one of a belt or chain connecting the electric motor output shaft and one or more propeller shafts.

5. The electric sterndrive propulsion unit of claim 3, further comprising a first right angle gear set between the electric motor output shaft and the drive shaft, and a second right angle gear set between the drive shaft and the one or more propeller shafts.

6. The electric sterndrive propulsion unit of claim 1 wherein the electric motor is oriented vertically and wherein the drive shaft is parallel to the electric motor output shaft and perpendicular to the one or more propeller shafts.

7. The electric sterndrive propulsion drive unit of claim 6, further comprising an inline mechanical coupling between the electric motor output shaft and the drive shaft, and a right angle gear set between the drive shaft and the one or more propeller shafts.

8. The electric sterndrive propulsion unit of claim 7 wherein the inline mechanical coupling between the electric motor output shaft and the drive shaft includes a planetary gear set.

9. The electric sterndrive propulsion unit of claim 6, further comprising a parallel gear set between the electric motor output shaft and the drive shaft, and a right angle gear set between the drive shaft and the one or more propeller shafts.

10. The electric sterndrive propulsion unit of claim 1, further comprising means to reduce or increase rotational speed of the one or more propeller shafts relative to the electric motor output shaft, wherein the means includes at least one selected from the group consisting of a belt, a chain and gears.

11. The electric sterndrive propulsion unit of claim 1, further comprising a liquid cooling system for cooling the electric motor.

12. The electric sterndrive propulsion unit of claim 11 wherein the liquid cooling system includes a heat exchanger positioned to transfer heat from the liquid cooling system into a body of water in which the propulsion unit operates.

13. The electric sterndrive propulsion unit of claim 12 wherein the liquid cooling system is positioned to lubricate at least one of a shaft, a gear set, or a bearing.

14. The electric sterndrive propulsion unit of claim 1, further comprising a mounting interface positioned to attach to the water vessel transom.

15. The electric sterndrive propulsion unit of claim 1, further comprising an electronic controller coupled to the electric motor.

16. The electric sterndrive propulsion unit of claim 1, further comprising:
   the water vessel; and
   one or more electric energy storage devices electrically coupled to the electric motor and positioned in the water vessel forward of the transom.

17. The electric sterndrive propulsion unit of claim 1 wherein the housing is watertight.

18. An electric sterndrive propulsion unit mountable to an external surface of a water vessel transom having an upper extremity, the propulsion unit comprising:

a sterndrive housing configured to fit below the upper extremity of the transom;

an electric motor positioned within the housing and having an output shaft;

an electrical cable coupled to the electric motor and positioned to extend through the transom to an electrical power source;

an intermediate drive shaft positioned within the housing and mechanically coupled to the output shaft;

one or more propeller shafts mechanically coupled to the intermediate drive shaft and extending outwardly from the housing;

one or more propellers mechanically coupled to the one or more propeller shafts external to the housing and positioned to be fully submerged; and a cooling system having a closed-loop liquid path in thermal communication with the electric motor, the cooling system having no water intake for drawing cooling water from a surrounding body of water.

19. An electric sterndrive propulsion unit mountable to an external surface of a water vessel transom having an upper extremity, the propulsion unit comprising:

a sterndrive housing configured to fit below the upper extremity of the transom;

an electric motor positioned within the housing and having a forward-facing output shaft;

an electrical cable coupled to the electric motor and positioned to extend through the transom to an electrical power source;

an intermediate drive shaft positioned within the housing and mechanically coupled to the forward-facing output shaft;

one or more propeller shafts mechanically coupled to the intermediate drive shaft and extending outwardly from the housing; and one or more propellers mechanically coupled to the one or more propeller shafts external to the housing and positioned to be fully submerged.

20. A motorboat, comprising:

a hull having a transom with an external surface and an upper extremity;

at least one propulsion battery carried by the hull forward of the transom; and an electric sterndrive propulsion unit mounted to the external surface of the transom, the propulsion unit comprising:

a sterndrive housing configured to fit below the upper extremity of the transom;

an electric motor electrically coupled to the at least one propulsion battery, positioned within the housing, and having an output shaft;

an electrical cable extending through the transom and coupled between the electric motor and the at least one propulsion battery;

an intermediate drive shaft positioned within the housing and mechanically coupled to the output shaft;

one or more propeller shafts mechanically coupled to the intermediate drive shaft and extending outwardly from the housing; and one or more propellers mechanically coupled to the one or more propeller shafts external to the housing and positioned to be fully submerged.

* * * * *